United States Patent
Cuciti et al.

(10) Patent No.: US 11,184,316 B2
(45) Date of Patent: Nov. 23, 2021

(54) PROCESSING OF MESSAGES EXCHANGED ON A SOCIAL NETWORK

(71) Applicant: TELECOM ITALIA S.p.A., Milan (IT)

(72) Inventors: Vincenzo Cuciti, Turin (IT); Marina Geymonat, Turin (IT); Chiara Lorenza Remondino, Turin (IT); Barbara Stabellini, Turin (IT); Paolo Tamborrini, Turin (IT)

(73) Assignee: TELECOM ITALIA S.p.A., Milan (IT)

(*) Notice: Subject to any disclaimer, the term of this patent is extended or adjusted under 35 U.S.C. 154(b) by 0 days.

(21) Appl. No.: 16/538,883

(22) Filed: Aug. 13, 2019

(65) Prior Publication Data
US 2020/0059448 A1 Feb. 20, 2020

(30) Foreign Application Priority Data
Aug. 14, 2018 (IT) .................. 102018000008086

(51) Int. Cl.
*G06F 15/16* (2006.01)
*H04L 12/58* (2006.01)
*G06F 17/16* (2006.01)

(52) U.S. Cl.
CPC .............. *H04L 51/32* (2013.01); *G06F 17/16* (2013.01); *H04L 51/12* (2013.01); *H04L 51/18* (2013.01); *H04L 51/22* (2013.01)

(58) Field of Classification Search
CPC ................................ H04L 51/12; H04L 51/22
See application file for complete search history.

(56) References Cited

U.S. PATENT DOCUMENTS

| | | | |
|---|---|---|---|
| 9,256,667 B2 | 2/2016 | Koudas et al. | |
| 10,555,138 B1* | 2/2020 | Wu ........................ | H04L 51/34 |
| 2006/0036462 A1 | 2/2006 | King et al. | |
| 2013/0036117 A1 | 2/2013 | Fisher et al. | |
| 2013/0151632 A1* | 6/2013 | Chodavarapu ......... | G06Q 50/01 709/206 |
| 2014/0136997 A1 | 5/2014 | Spivack et al. | |
| 2015/0172396 A1 | 6/2015 | Longo et al. | |

(Continued)

FOREIGN PATENT DOCUMENTS

WO   WO 2012/116241 A2   8/2012

*Primary Examiner* — Yves Dalencourt
(74) *Attorney, Agent, or Firm* — Oblon, McClelland, Maier & Neustadt, L.L.P.

(57) ABSTRACT

In a method for processing messages exchanged on a social network, a data processing apparatus gathers from the social network a reference set of messages pertaining to a user-selected reference context. The data processing apparatus then applies a multidimensional aggregation to the reference set of messages, whereby the messages of the reference set are grouped in an multidimensional array of groups having at least two dimensions. In each dimension, the array comprises a number of groups that correspond to a number of values of a certain message feature. Each group in a dimension corresponding to a certain message feature aggregates all the messages of the reference set whose message feature has a same value. Then, a user interface is displayed, which shows the reference set of messages as aggregated in at least two dimensions of the array.

10 Claims, 8 Drawing Sheets

(56) References Cited

U.S. PATENT DOCUMENTS

| | | | |
|---|---|---|---|
| 2016/0094646 A1* | 3/2016 | Spivack | H04L 67/1042 |
| | | | 709/204 |
| 2017/0061469 A1 | 3/2017 | Garrity et al. | |
| 2018/0095957 A1* | 4/2018 | Mishne | G06F 16/313 |
| 2018/0232917 A1* | 8/2018 | Ni | G06T 11/206 |
| 2020/0005326 A1* | 1/2020 | Gabriel | G06Q 30/00 |

* cited by examiner

PROCESSING OF MESSAGES EXCHANGED ON A SOCIAL NETWORK

TECHNICAL FIELD

The present invention generally relates to the field of data processing techniques. In particular, the present invention relates to a method, an apparatus and a computer program for processing messages exchanged on a social network.

In the present description and in the claims, the expression "social network" will designate a website or computer program enabling social interaction on the Internet between users, namely enabling users to share with their personal connections on the Internet information, comments, messages, images, etc.

BACKGROUND ART

Nowadays, social networks such as Twitter® or Facebook® allow users to exchange messages on various topics on a worldwide scale.

Such messages (e.g. the "tweets" on Twitter®) may comprise different types of contents to be shared with the other users, for example texts, images, audio, videos or hypertext links. Each message also typically comprises metadata associated with the content and comprising information on the message such as message identifier, username of the message's author, date and time at which the message was published, place where the message was originated, etc.

Techniques are known for analyzing messages exchanged on a social network. Such analysis can indeed provide key insights into public opinion on a variety of topics, for example products, political views, entertainment, etc. Analysis of the messages exchanged on a social network can also identify events of interest and provide insights on the usefulness and effect of marketing campaigns in the case of products, public relations strategies, public figures, etc.

U.S. Pat. No. 9,256,667 describes a method for searching text sources including temporally-ordered data objects, such as a blog, which provides for generating a search query based on terms and time intervals, identifying data objects based on the search query, and generating popularity curves based on the frequency of data objects corresponding to one or more of the search terms in the one or more time intervals.

SUMMARY OF THE INVENTION

The Applicant has perceived that the above known technique of U.S. Pat. No. 9,256,667 has some drawbacks.

In particular, the Applicant has noticed that, according to U.S. Pat. No. 9,256,667, once a certain set of messages to be analyzed has been identified by applying a certain query with one or more keywords, such identified set of messages is analyzed from a single point of view, namely taking into account a single feature of the identified messages. U.S. Pat. No. 9,256,667 for instance describes a time analysis, which provides a popularity graph showing how often the one or more queried keywords have been mentioned in a particular temporal window; or a keyword correlation analysis, which provides a table or graph showing the correlation between the queried keywords; or a "hot keywords" analysis, which provides a page wherein each queried keyword is shown in a font size proportional to its level of interestingness; or a geographic analysis, which provides a map showing the geographical distribution of the queried keyword(s).

Hence, each time a user wishes to analyze the identified messages from a certain point of view, she/he performs a separate query which produces as output a graph illustrating only that aspect of the identified messages. If the user wishes to analyze the identified messages from different points of view, she/he disadvantageously has to perform several separate queries. This is inconvenient and may take a long time.

Even worse, the technique of U.S. Pat. No. 9,256,667 is not capable of providing a systemic analysis of the identified messages, wherein the expression "systemic analysis" designates an analysis of the relations between the messages. The Applicant has indeed realized that the messages exchanged on a social network may be reciprocally related, namely their contents and/or their metadata may share one or more common features. By way of non limiting example, as the far as the messages' content is concerned, such common features may be:

- a same hashtag (namely, a keyword preceded by "#");
- a same cited username (namely, a username preceded by "@");
- a same type of content (e.g. video or audio or image);
- a same or similar content's feature (e.g. images with a same subject, audio with a similar tonal pattern, etc.).

Further, by way of non limiting example, as far as the metadata is concerned, such common features may be:

- a same author;
- publication dates and times of the related messages belonging to a same period (e.g. a same day or a same week);
- origin places of the related messages belonging to a same geographic area;
- authors originating the related messages having a same profile feature on the social network (e.g. number of contacts, reach, activity degree, interaction degree, etc.).

The Applicant has realized that an analysis of the relations between the messages (and not of the single messages) is most valuable and meaningful for the purpose of determining trends and properties of discussions on social networks.

In view of the above, the Applicant has tackled the problem of providing a method and apparatus for processing messages exchanged on a social network which overcome the aforesaid drawbacks.

In particular, the Applicant has tackled the problem of providing a method and apparatus for processing messages exchanged on a social network which allow the user to simultaneously analyse multiple aspects of the relations amongst a certain set of messages exchanged on a social network.

According to embodiments of the present invention, such problem is solved by a data processing apparatus which gathers from the social network a reference set of messages pertaining to a certain user-selected reference context (e.g. a conference, a cultural or political event, etc.). The apparatus applies a multidimensional aggregation to the reference set of messages, namely it groups them in an array of groups having at least two dimensions. In each dimension, the array comprises a number of groups that correspond to a number of values of a certain message feature (e.g. in a first dimension N1 groups corresponding to N1 different timeslots TS(1), TS(2) . . . TS(N1) during which the message was published, in a second dimension N2 groups corresponding to N2 different hashtags #hashtag(1), #hashtag(2), . . . #hashtag(N2) comprised in the message's content, and so on). In each dimension, each group aggregates all the messages of the reference set whose message feature corresponding to that dimension has a same value. Then, a user interface is displayed which is configured to show the reference set of messages as aggregated in at least two dimensions of the array.

Advantageously, the multidimensional aggregation performed by the data processing apparatus according to the present invention allows the user investigating at the same time the relations amongst the messages of the reference set from various points of view, namely to conduct a systemic analysis of such messages in a easy and intuitive way, by interacting with the user interface.

Since the user interface is configured to show the reference set of messages as aggregated by the data processing apparatus in the various dimensions of the array, the user may obtain from the user interface information on various aspects of the relations amongst the messages of the reference set (e.g. time, hashtag, etc.) by simply interacting with the user interface, with no need to perform complex operations such as multiple queries etc.

This way, the user may identify trends, key hashtags, key users, places, new topics, etc. associated with the reference context to which the reference set of messages pertain.

Besides, the above processing may be performed in near-real time, namely while the exchange of messages pertaining to the reference context is ongoing. The user may accordingly perform a systemic analysis of such messages in near-real time, so that she/he may use the analysis results for taking actions within the references context, e.g. to improve the communication effectiveness, to increase the reach of the discussion, to increase the participation to the discussion of a certain group of users, etc.

According to a first aspect, the present invention provides a method for processing messages exchanged on a social network by a plurality of user devices connected to a communication network supporting the social network, the method comprising, at a data processing apparatus cooperating with the social network through the communication network:

a) gathering from the social network a reference set of messages pertaining to a user-selected reference context;
b) applying a multidimensional aggregation to the reference set of messages, the multidimensional aggregation comprising grouping the messages of the reference set in an array of groups having at least two dimensions, the array comprising, in each dimension, a number of groups that correspond to a number of values of a respective message feature, wherein each group of the number of groups aggregates all the messages of the reference set whose respective message feature has a same value; and
c) displaying a user interface configured to show the reference set of messages as aggregated in at least two dimensions of the array.

Preferably, at step a) the reference set of messages is obtained by applying to the messages exchanged on the social network a filtering rule based on one or more values of at least one filtering message feature of the messages, the at least one filtering message feature being chosen amongst:
 origin place of the messages;
 publication date and/or time slot of the messages;
 author of the messages;
 username and/or hashtag and/or keyword cited in the messages;
 language of messages;
 action performed on messages;
 type of content of messages;
 content's feature of messages.

The filtering rule may be based on a single value of a single filtering message feature or on multiple values of a single filtering feature. Alternatively, the filtering rule may be based on values of a combination of filtering message features.

Preferably, step a) is performed by an importer software program through invocation of an application programming interface of the social network.

Preferably, the method further comprises, after step a), storing the reference set of messages in a database accessible by the data processing apparatus, the storing comprising:
 generating a unique identifier for each message of the reference set of messages; and/or
 deleting at least one redundant or unused field of each message of the reference set of messages; and/or
 generating additional information for each message of the reference set of messages by processing content and/or metadata of each message, the additional information comprising one or more of: type of content; reach of the message's author; and an indication as to whether each message is an original message or a republished message.

Preferably, at step b) the message feature is chosen amongst:
 origin place of the reference set of messages;
 publication date and/or time slot of the reference set of messages;
 author of the reference set of messages;
 username and/or hashtag and/or keyword cited in the reference set of messages;
 language of the reference set of messages;
 action performed on the reference set of messages;
 type of content of the reference set of messages;
 content's feature of the reference set of messages.

Preferably, at step b) said grouping comprises creating a document collection comprising a plurality of objects, each object corresponding to a respective message of the reference set of messages, the document collection having a hierarchical structure with multiple levels, each level of the hierarchical structure corresponding to a respective dimension of the array.

Preferably, at step b) the number of values of the respective message feature are predefined values decided by a user.

Preferably, step b) also comprises applying a further multidimensional aggregation to the reference set of messages, the further multidimensional aggregation comprising expanding the array of groups by adding, in a further dimension, a further number of groups that correspond to a further number of values, or of clusters of values, of an emerging message feature as discovered in the reference set of messages by the data processing apparatus, each group of the further number of groups aggregating all the messages of the reference set whose emerging message feature has a same value of the further number of values or a value belonging to a same cluster of the further cluster of values.

Preferably, the emerging message feature is chosen amongst:
 message author;
 username and/or hashtag and/or keyword cited in message;
 origin zone of the message;
 message content's feature.

Preferably, a group is added to the array of groups in the further dimension if the corresponding feature qualifies as significant, the distribution of the values of this feature being different from an expected distribution in the reference set of messages.

More preferably, a group is added to the array of groups in the further dimension if the number of occurrences of the corresponding value of the emerging message feature in the set of reference messages exceeds a set threshold, under which the corresponding value of the emerging message feature is considered non significant.

Preferably, step c) comprises visualizing the user interface on a display of a terminal connected with the data processing apparatus.

Preferably, the user interface is configured to provide by default a graphic representation of the reference set of messages as aggregated in at least one dimension of the array, as a user opens it.

Preferably, the user interface is configured to be browsed by said user so as to provide a graphic representation of said reference set of messages as aggregated in at least one further dimension of the array.

According to a second aspect, the present invention provides a data processing apparatus comprising a processor configured to perform the steps of the method as set forth above.

According to a third aspect, the present invention provides a computer program product comprising instructions which, when executed by a computer, cause the computer to carry out the steps of the method as set forth above.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
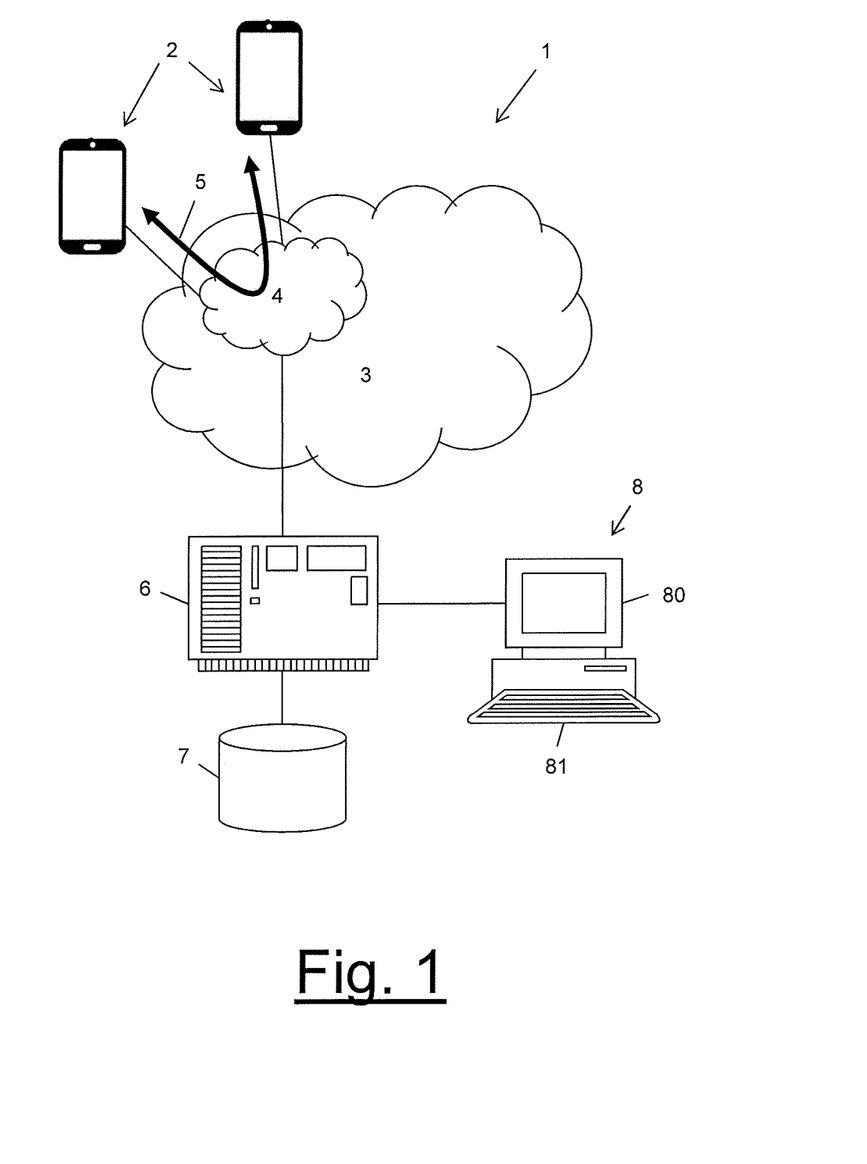
FIG. 1 schematically shows an exemplary environment in which the method for processing messages exchanged on a social network is implemented, according to an embodiment of the present invention.

FIG. 1 schematically shows an exemplary environment 1 in which the method for processing messages exchanged on a social network is implemented, according to an embodiment of the present invention.

Such exemplary environment 1 comprises a plurality of user devices (e.g. smartphones) 2 connected to a communication network 3 supporting a social network 4, wherein "supporting" means that the social network 4 exploits the connections and apparatuses of the communication network 3 to enable the users of the user devices 2 to share with their personal connections information, comments, messages, images, etc. For simplicity, in FIG. 1 only two user devices 2 are shown. However, it is understood that the exemplary environment 1 typically comprises a multitude of user devices 2 (up to millions), especially if it is assumed that the communication network 3 is the Internet and the social network 4 is Twitter® or Facebook®.

The user devices 2 exchange messages 5 (e.g. tweets, in case of Twitter®) via the social network 3, by transmitting and receiving corresponding data signals to and from the communication network 3. The properties of the data signals transmitted and received by each user device 2 depend on the type of connection between that user device 2 and the communication network 3, which may be wired (e.g. Ethernet), wireless (e.g. Wi-Fi) or mobile (e.g. LTE).

Each message 5 exchanged amongst the user devices 2 via the social network 4 preferably comprises a content and metadata associated with the content.

As far as the content is concerned, each message 5 may comprise a text and/or an image and/or a video and/or an audio and/or a hypertext link to an external document (e.g. a web page, an article, etc.). The text and/or the external document—if any—may comprise for instance one or more hashtags preceded by the hash character "#" and/or one or more cited usernames preceded by the at sign "©".

As far as metadata are concerned, each message 5 typically comprises a message identifier uniquely identifying the message 5 on the social network 4, a username of the message's author, date and time at which the message 5 was published, place where the message 5 was originated, number of users who have already visualized the message's content etc. The exchanged messages 5 (namely, their content and metadata) are typically stored on a database of the social network 4, not shown in FIG. 1.

As shown in FIG. 1, a data processing apparatus 6 is preferably connected to the social network 4 via the communication network 3. The data processing apparatus 6 preferably comprises a processor configured to analyze the messages (and, in particular, the relations amongst the messages) exchanged by the user devices 2 on the social network 4, as it will be described in detail herein after with reference to the flow chart of FIG. 2.

The data processing apparatus 6 is preferably provided with access to a database 7, which stores the messages to be processed and the results of the processing.

A terminal 8 is also connected to the data processing apparatus 6, which is provided with a display 80 and input means 81 (e.g. keyboard and/or mouse and/or touchpad and/or touchscreen). The terminal 8 may be co-located with the apparatus 6 or may be a remote terminal connected to the apparatus 6 through the communication network 3. Further, several terminals 8 connected to the apparatus 6 may be provided, so as to allow several users to interact with the apparatus 6.

Figure 2:
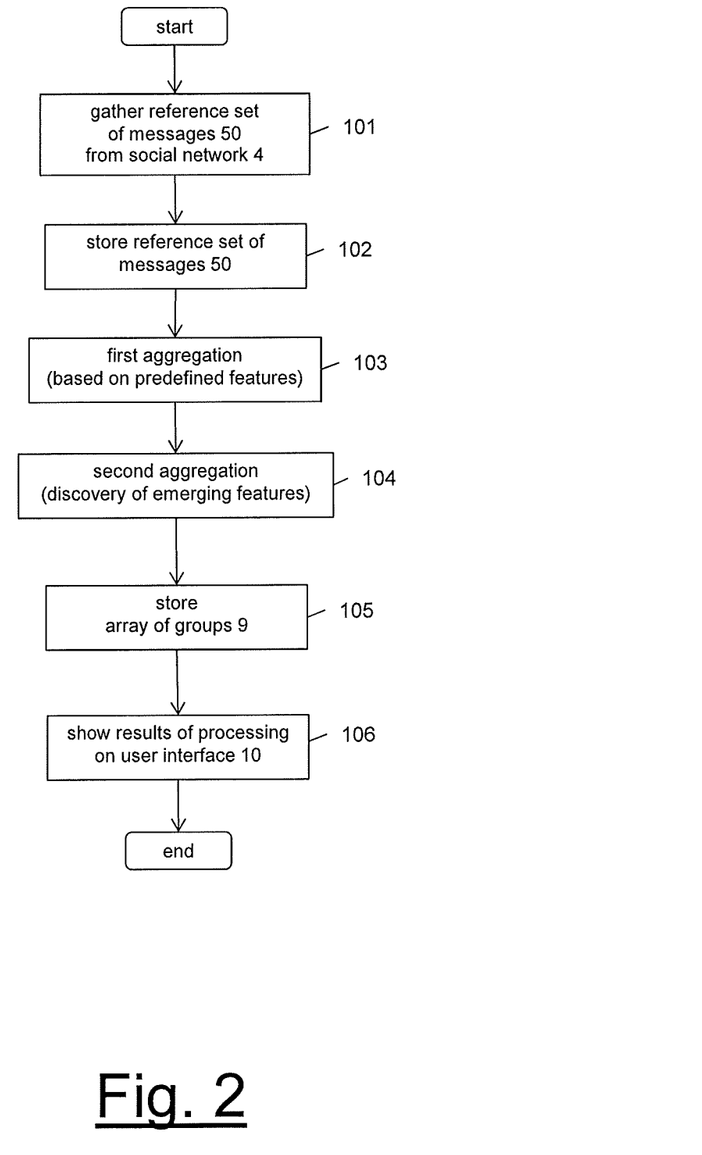
FIG. 2 is a block diagram of the steps of the method for processing messages from a social network, according to an embodiment of the present invention.

FIG. 2 is a flow chart schematically showing the steps of the method for processing the messages 5 exchanged on the social network 4, according to an embodiment of the present invention, as performed by the processor of the data processing apparatus 6.

A first step 101 comprises gathering from the social network 4 a reference set of messages 50 selected amongst all the messages 5 exchanged on the social network 4. At step 101 the processing apparatus 6 may for instance apply a filter which the user configures to select, amongst all the messages 5 exchanged on the social network 4, only those pertaining to a certain reference context, such as for instance a sport or cultural event, a corporate initiative, a conference, etc.

As filtering rule for configuring the filter to be applied at step 101, the user may use one or more features of the message content and/or metadata associated therewith, for instance selected amongst:

a) origin place of the messages;
b) date and/or time slot of the messages' publication;
c) messages' author(s);
d) usernames cited in the messages' content;
e) hashtag(s) contained in the messages' content;

f) keywords (e.g. the name of a city, of a celebrity or personality, of an event, etc.) contained in the messages' content;
g) language of the messages;
h) actions performed on the messages within the social network 4 (publication, sharing, like, forwarding, retweeting, citation, etc.);
i) type of content of the messages (text, image, video, hypertext link to an external content, etc.);
j) content's feature (e.g. texture or subject of an image, tonal pattern of an audio, etc.).

The filtering rule may comprise a single value of a feature (e.g. a single hashtag, a single message's author, a single type of content, etc.) or multiple values of a same feature (e.g. multiple related hashtags, multiple authors, etc.). In any case, at this stage the value(s) of the feature(s) to be used by the processing apparatus 6 for filtering the messages 5 and identifying the reference set of messages 50 are decided by the user a priori, namely without any knowledge of the messages' content or metadata.

As filtering rule, a single feature may be used, or a combination thereof. For example, if an analysis shall be done on the messages 5 exchanged on the social network 4 in connection with an event or topic identified by one or more related hashtags, the filtering rule may be only that hashtag(s), so that at step 101 the filter applied by the data processing apparatus 6 selects only the messages comprising that hashtag(s). If an analysis shall be done on the messages 5 exchanged on the social network 4 e.g. to discover weekend activities and events in a certain city and investigate their popularity, the filtering rule may be a combination of date and time slot of the messages' publication and origin place of the messages, so that at step 101 the filter applied by the data processing apparatus 6 selects only the messages 5 published during the weekend and originated in the city of interest. If one wishes to limit such latter analysis e.g. only to photos, the above filtering rule may be further combined with the type of content of the messages, so that at step 101 the filter selects only the messages containing photos. And so on.

For instance, in case the social network 4 is Twitter®, step 101 may be performed by the data processing apparatus 6 using a known importer software program gathering the messages by using an invocation of the streaming API of Twitter® (Public Stream, endpoint POST statuses/filter", parameter "track") that produces a notification in JSON (JavaScript Object Notation) format each time a message 5 complying with the filtering rule is found. Optionally, the importer may invoke one or more ad-hoc software modules configured to enrich the metadata of the messages exchanged on the social network 4 with information which are not available to the API and which are part of the filtering rule to be applied at step 101 (e.g. the content's feature at the above point j)).

Once the reference set of messages 50 has been gathered by the data processing apparatus 6 from the social network 4 by applying the above described filter, the data processing apparatus 6 preferably stores each message of the reference set 50 in the database 7 (step 102).

For this purpose, at step 102 the data processing apparatus 6 preferably prepares each message of the reference set 50 for its storage. In particular, at step 102 a unique identifier is preferably generated for each message to be stored, which uniquely identifies the message within the context of the processing performed by the data processing apparatus 6 (and which is in general different from—and shorter than— that which identifies the message within the social network 4). The unique message identifier generated at step 102 may be for example an alphanumeric string.

Further, at step 102, the format of each message to be stored is preferably changed into a format suitable for the storage. For instance, the timestamps formats are adapted, the redundant or unused field(s) of each message are deleted, etc.

Further, at step 102, for each message to be stored additional information are preferably generated, by processing the message's content and/or the message's metadata. For example, such additional information may comprise:
  the type of content (video, image, audio, hypertext link to a document) comprised in the message;
  the reach (namely, the number of contacts on the social network 4) of the author of the message; and
  an indication as to whether the message is an original message or a republished message (e.g. a tweet or a retweet, in case the social network 4 is Twitter®).

After such processing, at step 102 each message of the reference set 50 is then stored in the database 7, together with its unique identifier, its content, its metadata and its additional information.

Then, the data processing apparatus 6 preferably applies a first multidimensional aggregation to the messages of the reference set 50 (step 103).

The first multidimensional aggregation preferably comprises grouping the messages of the reference set 50 in a multidimensional array of groups 9. In each dimension, the data processing apparatus 6 provides the array 9 with a number of groups that correspond to a number of predefined values (namely, values decided by the user) of a certain message feature, in particular of the messages' content, metadata or additional information. In particular, in a dimension corresponding to a certain message feature, each group of the array 9 aggregates all the messages of the reference set 50 whose feature has a same value of a number of predefined values decided by the user.

The messages features considered in such first multidimensional grouping at step 103 may be chosen amongst features a)-j) listed above.

Figure 3:
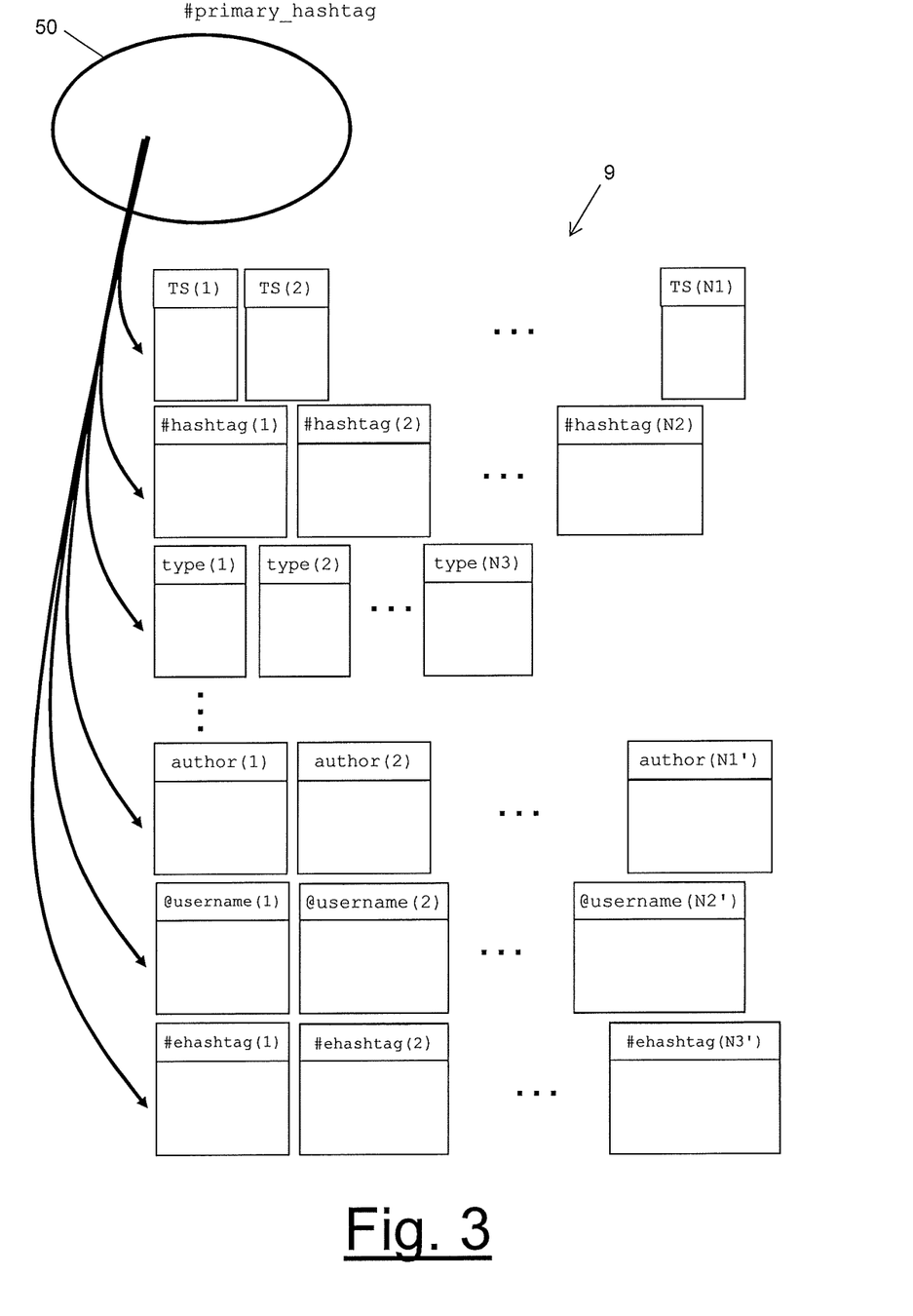
FIG. 3 schematically shows an exemplary implementation of some steps of the method according to an embodiment of the present invention.

For example, assuming that the data processing apparatus 6 has selected the reference set of messages 50 based on a primary hashtag #primary_hashtag associated with a certain event, the data processing apparatus 6 may then group the messages of the reference set 50 in a multidimensional array 9 schematically depicted in FIG. 3 and comprising:
  N1 groups in a $1^{st}$ dimension, each group comprising all the messages of the reference set 50 which were published in a same time slot of N1 timeslots TS(1), TS(2) . . . TS(N1) decided by the user (preferably, the user may set start time and duration of each time slot);
  N2 groups in a $2^{nd}$ dimension, each group comprising all the messages of the reference set 50 containing a same secondary hashtag of N2 different secondary hashtags #hashtag(1), #hashtag(2), . . . #hashtag(N2) related to the primary hashtag #primary_hashtag and decided by the user;
  N3 groups in a $3^{th}$ dimension, each group comprising all the messages of the reference set 50 (namely, comprising the #primary_hashtag) containing a same type of content of N3 types of content type(1), type(2) . . . type(N3) decided by the user; and so on.

In order to form each single group of the array 9 based on a certain value of a certain message feature, the data processing apparatus 6 may use any known technique. If the feature is in the metadata associated with the messages' content, for example, the techniques described by US 2013/

0036117 or US 2006/0036462 may be used. If the feature is a textual feature in the messages' content, the technique described by U.S. Pat. No. 9,256,667 may be used.

It shall be noticed that a group in a certain dimension of the array 9 is empty, if none of the messages of the reference set 50 has the message feature corresponding to that dimension with the predefined value corresponding to that group. Besides, the data processing apparatus 6 may insert a same message of the reference set 50 simultaneously in several groups. For instance, a message comprising both the secondary hashtags hashtag(1), #hashtag(2) and being published during the timeslot TS(N1) is simultaneously comprised in all the groups related to such features' values.

In order to implement the above described multi-dimensional aggregation on the reference set of messages 50, data processing apparatus 6 preferably suitably labels the messages of the reference set 50. In particular, the data processing apparatus 6 creates a document collection, having a hierarchical structure with multiple level, each level corresponding to a dimension of the array 9.

For instance, considering the above exemplary array 9, a portion of an exemplary document collection written in JSON is set forth herein after:

```
{
    "#hashtag(1)":{
        "TS(1)":[obj1, obj2, obj3],
        "TS(2)":[obj4, obj5, obj6],
        ...
        "TS(N1)":[...],
    },
    ""#hashtag(2)":{
        "TS(1)":[...],
        "TS(2)":[...],
        ...
        "TS(N1)":[...],
    },
    ...
    "hashtag(N2)":{
        "TS(1)":[...],
        "TS(2)":[...],
        ...
        "TS(N1)":[...],
    },
}
```

Each single object indicated in brackets basically is a pointer to the identifier of the message and an indication of the type of content of the message, namely:

```
obj:{
    "id":"id1",
    "type":"image"
}
```

Then, according to preferred embodiments, the data processing apparatus 6 applies a second multidimensional aggregation to the reference set of messages 50 (step 104). The second multidimensional aggregation preferably comprises, by the data processing apparatus 6, expanding the multidimensional array 9 created at step 103 by adding new groups in at least one further dimension, and grouping again the messages of the reference set 50 in such new groups.

In particular, preferably, at step 104 the data processing apparatus 6 preferably reads content and/or metadata of each message of the reference set 50 to discover one or more further significant message features. Such further message features (also termed herein after "emerging features") may be, for instance:

k) further messages' author(s), other than the one(s) which might have been used at either step 101 or 103;

l) further usernames cited in the messages' content, other than the one(s) which might have been used at either step 101 or 103;

m) further hashtag(s) contained in the messages' content, other than the one(s) which might have been used at either step 101 or 103;

n) further keywords (e.g. the name of a city, of a celebrity or personality, of an event, etc.) contained in the messages' content, other than the one(s) which might have been used at either step 101 or 103; or o) further content's feature (e.g. subject of an image, tonal pattern of an audio, etc.), other than the one(s) which might have been used at either step 101 or 103.

Preferably, in order to perform step 104 the system is set up by preselecting the set of features among which the data processing apparatus 6 searches for emerging features to be discovered in the messages of the reference set 50 and by defining the expected distributions of such set of features. Preferably the user can set up a maximum number of emerging features that can be displayed, but has no a priori knowledge of which will be the emerging features and of the values of such emerging feature in the messages. She/he even does not know if that emerging feature is present at all in the messages of the reference set 50. More preferably, however, the maximum number of emerging features to be displayed is set by the user to 2.

Furthermore, the user may decide to display specific features of the reference set 50 even if they do not qualify as emerging features based on the previous description. For example, the user may display further hashtag(s) contained in the messages' content, but does not known a priori what such further hashtags may be or even if hashtags different from those used by the data processing apparatus 6 for the filtering step 101 or for the first grouping step 103 are present at all in the messages.

For each emerging feature to be discovered, at step 104 the data processing apparatus 6 adds further groups to the array 9 created at step 103, in a corresponding further dimension thereof.

In order for a feature to qualify as significant, and therefore as an "emerging feature", the distribution of the values of this feature in the reference set of messages 50 shall be different from an expected distribution. The expected distribution depends on the specific feature: in some cases it is a random distribution, in other cases it is well known, e.g., the daily data traffic distribution is a curve that increases in the morning and decreases at night. In case of a feature that is represented through a set of parameters (typically named low-level-features, i.e. features with a low semantic value, such as an image or video that is represented through luminance, color histograms or texture) the deviation from the expected distribution may be identified by performing a multidimensional grouping or clustering, in order to identify the presence of particularly dense or relevant groups or clusters, which is a proxy for deviation from the expected distribution. The greater the deviation from the expected distribution, the higher the significance of the corresponding feature. The deviation from the expected distribution, namely, may convey significant information.

Then, for each emerging feature, for each different value, or cluster of values, identified as significantly deviating from an expected distribution, the data processing apparatus 6 creates a separate group, which groups all the messages of the reference set 50 that comprise the emerging feature with that value or with a value belonging to that cluster.

For instance, with reference again to FIG. 3, if the multidimensional array at the end of step 103 has N dimensions, at step 104 the data processing apparatus 6 may add the following groups:

- N1' groups in a $(N+1)^{th}$ dimension, each group comprising all the messages of the reference set 50 having a same author author(1), author(2), . . . author(N1') as discovered in the metadata of the messages of the reference set 50;
- N2' groups in a $(N+2)^{th}$ dimension, each group comprising all the messages of the reference set 50 containing a same cited username @username(1), @username (2), . . . @username(N2') as discovered in the content of the messages of the reference set 50;
- N3' groups in a $(N+3)^{th}$ dimension, each group comprising all the messages of the reference set 50 containing a same emerging hashtag #ehashtag(1), #ehashtag (2), . . . #ehashtag(N3') as discovered in the content of the messages of the reference set 50;
- N4' groups in a $(N+4)^{th}$ dimension, each group comprising all the messages of the reference set 50 originated by actions of different types (publication, forwarding, sharing, republication, etc.) on a same original message, as discovered in the additional information of the messages of reference set 50 (such groups are not shown in FIG. 3 for simplicity); and so on.

According to a preferred embodiment, the data processing apparatus 6 creates a group for a certain value of an emerging feature if the number of occurrences of that value in the messages of the reference set 50 exceeds a set threshold, under which that value of the emerging feature is considered non significant. The user may set the threshold for each emerging feature to be discovered taking into account, for example, the type of emerging feature and the overall number of messages in the reference set 50. For instance, a single occurrence of a certain author may be considered sufficient to create a corresponding group, whereas several occurrences of a same emerging hashtag or cited username are preferably required to consider that emerging hashtag or cited username statistically significant and create a correspond group in the array 9.

The aggregations at step 103 and 104 may be executed by a stand-alone process (e.g. a Node.js process), possibly using further data accessible via a programming interface (e.g. Web API).

The data processing apparatus 6 then preferably stores the array of groups 9 in the database 7 (step 105).

Once the data processing apparatus 6 has completed the array of groups 9 as described above and stored it in the database 7, at any time the user may use the terminal 8 connected with the data processing apparatus 6 to visualize a graphic interface 10 showing the processing results (step 106). In particular, the user interface 10 is preferably visualized on the display 80 of the terminal 8.

As it will be described in detail herein after with reference to FIGS. 4a-4e, the user interface 10 advantageously provides a systemic view of the reference set of messages 50, namely a view of the relations amongst these messages. The user interface 10 is in particular configured to provide a graphic representation of the messages as aggregated in every dimension of the array 9, each dimension corresponding to a certain aspect of the relations amongst the messages.

A graphic representation of the messages as aggregated in at least one dimension of the array 9 is preferably provided by default by the user interface 10, as the user opens it on the display 80 of the terminal 8. By the input means 81 of the terminal 8, the user may request the user interface 10 to provide a graphic representation of the messages as aggregated in other dimensions of the array 9, according to the aspect(s) of the relations amongst the messages that she/he wishes to investigate.

Figure 4A:
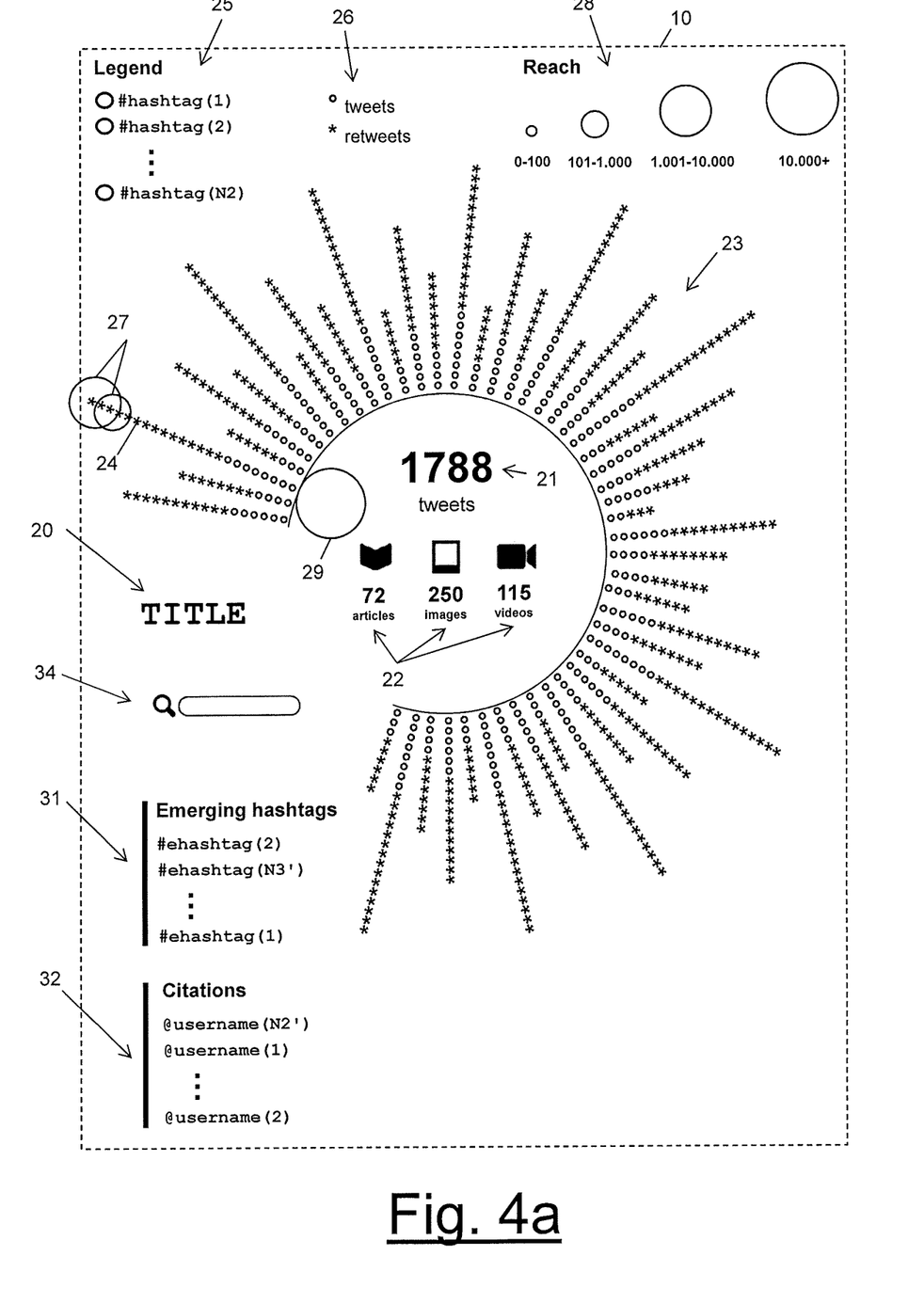
FIGS. 4a-4e show an exemplary user interface provided by the method for processing messages from a social network according to embodiments of the present invention.

An exemplary user interface 10 is schematically depicted in FIGS. 4a-4e. FIG. 4a shows the initial appearance of the user interface 10, namely its appearance as the user opens it, before she/he starts interacting with it.

As shown in FIG. 4a, the user interface 10 may comprise information indicative of the reference set of messages 50 as a whole, e.g. a title 20 indicative of the considered reference context and an indication 21 of the overall number of messages of the reference set 50.

The user interface 10 also preferably provides an indication on the reference set of messages 50 as aggregated in a first dimension of the array 9, in particular the dimension corresponding to the type of content type(1), type(2), . . . type(N3). Assuming that only three types of contents are considered (for instance documents, images and videos), for each type of content the user interface 10 preferably displays an indication 22 of the number of messages comprising that type of content. Each type is preferably associated with a respective icon.

The user interface 10 also comprises a graph 23 showing the reference set of messages 50 as aggregated in a second dimension of the array 9, in particular the dimension corresponding to the timeslots TS(1), TS(2) . . . TS(N1) in which the messages have been published. By way of non limiting example, the graph 23 comprises a timeline (in particular, a curved timeline) from which a number of rays 24 project outwardly. Each ray 24 corresponds to a respective timeslot TS(1), TS(2) . . . TS(N1) and has a length indicative of the number of messages published in that timeslot. In particular, each ray 24 is formed by a number of elements equal to the number of messages published during the corresponding timeslot.

The graph 23 is also configured to show the reference set of messages 50 as aggregated in a second dimension of the array 9, in particular the dimension corresponding to the secondary hashtags #hashtag(1), #hashtag(2), . . . #hashtag (N2). For instance, each secondary hashtag may be associated with a respective colour as indicated by a legend 25 also shown by the user interface 10. Within each ray 24, each element is therefore coloured by the colour associated to the secondary hashtag it contains.

Within each ray 24, each element representing a message preferably has graphical properties which provide a graphical and immediate view of some features of the message itself. For instance, two different types of elements (e.g. circles and stars, as shown in FIG. 4a) or two different colors may be used for representing original messages (e.g. tweets) and republished messages (e.g. retweets), respectively, as indicated by a further legend 26 which is also comprised in the user interface 10.

Moreover, each element representing a message may be encircled by a respective circle 27 (only two circles 27 in a single ray 24 are depicted in FIG. 4a, for simplicity) providing an indication of the message reach within the social network 4. Different diameters of the circles 27 indicate different ranges for the reach's value, as indicated by a further legend 28 which is also comprised in the user interface 10. The user interface 10 may also comprise, for each ray 24, a respective further circle 29 indicating the overall reach, on the social network 4, of all the messages published during the associated timeslot. The overall reach represented by the circle 29 is calculated by merging the reaches of all the messages of the timeslot.

Therefore, even before the user starts interacting with the user interface 10, by default the user interface 10 advantageously provides a very intuitive representation of different aspects of the relations amongst the messages of the reference set 50 (time, secondary hashtag, type of content), each aspect corresponding to a different dimension of the array of groups 9 resulting from the aggregations executed by the data processing apparatus 6 at steps 103-104. The user interface 10 also advantageously provides by default a very intuitive representation of some features of each single message (tweet or retweet, reach).

Moreover, as mentioned above, the user may interact with the user interface 10 so as to investigate other aspects of the relations amongst the messages, which are related to other dimensions of the multidimensional array 9.

Figure 4B:
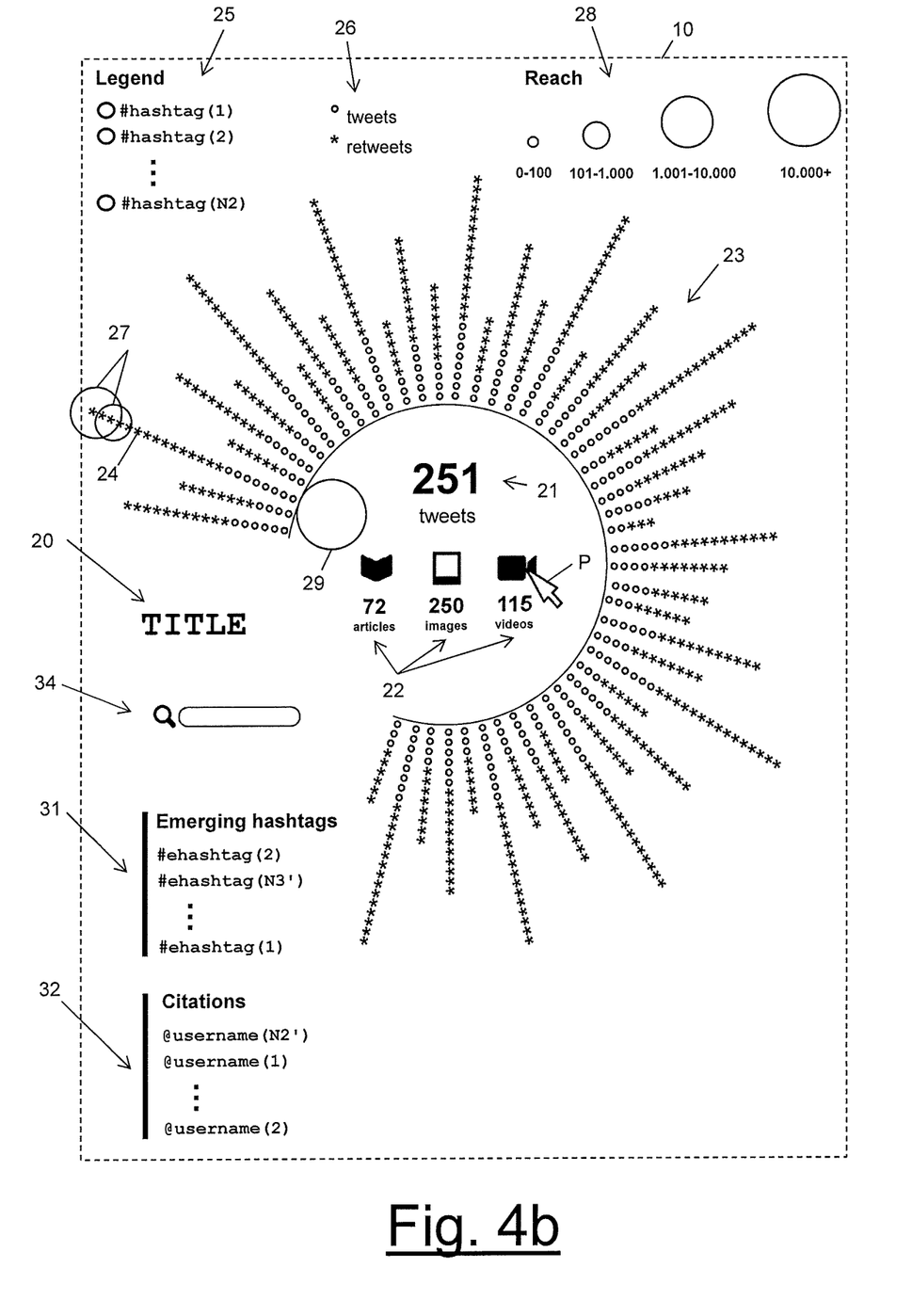

For instance, if the user selects one of the icons corresponding to a type of content type(1), type(2), ... type(N3), the user interface 10 preferably shows in further detail the reference set of messages 50 as aggregated in the dimension of the array 9 which corresponds to the type of content. In particular, as shown in FIG. 4b, if the user selects a certain type of content (e.g. videos) by means of a pointer P, the user interface 10 shows all the messages (tweet and retweets) containing videos. For instance, all the ray elements of the graph 23 corresponding to messages containing content types other than the selected one may be faded, so that the latter only are highlighted, as shown in FIG. 4b. This provides an immediate and intuitive view of the messages containing videos.

Preferably, also the indication 21 is updated, so that it indicates the overall number of messages (tweets and retweets) containing the selected type of content only.

Figure 4C:
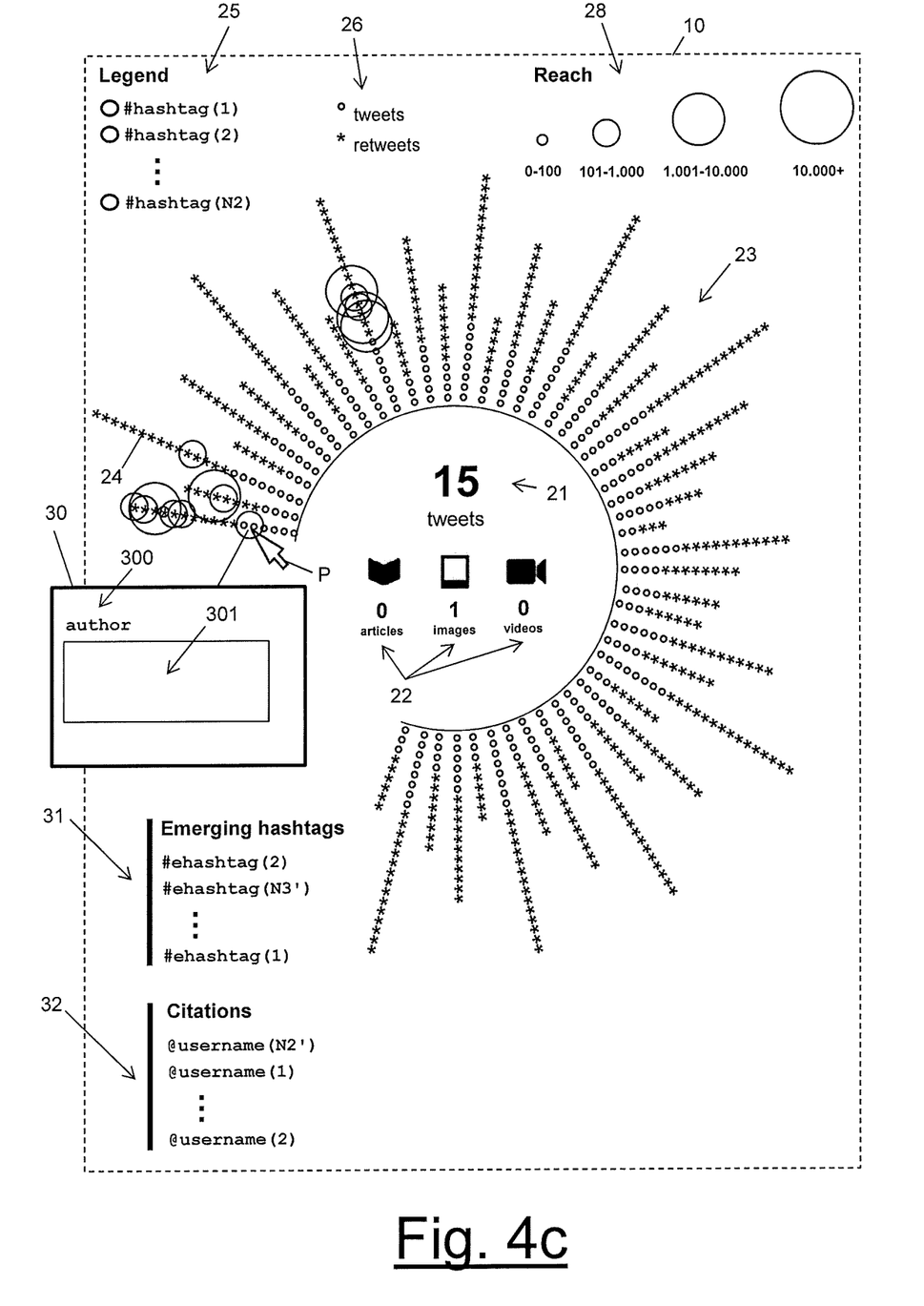

Moreover, the user interface 10 may also show the reference set of messages 50 as aggregated in a further dimension of the array 9, in particular that of messages originated by actions of different types (publication, forwarding, sharing, republication, etc.) on a same message. If, starting from the user interface 10 as in FIG. 4a, the user selects a message (e.g. a tweet) by clicking the corresponding ray element in the graph 23, the user interface 10 shows all the messages of the reference set 50 which are related to the selected message by actions of different types (e.g. its retweets). For instance, as shown in FIG. 4c, all the ray elements of the graph 23—except the selected message and the related ones, together with their respective reach circles—may be faded, so that the latter only are highlighted. This provides an immediate and intuitive view of the "word-of-mouth" effect of the selected message. For instance, from the exemplary situation depicted in FIG. 4c, the user may see that a tweet selected by the pointer P—which was published during the first considered timeslot—has been retweeted a certain number of times within the same timeslot and then a decreasing number of times in the subsequent timeslots. No retweeting has been made for a certain number of timeslots (probably because the topic of the discussion had changed), but then a burst of retweeting is found again during a certain timeslot (probably because the discussion reverted to a topic related to that of the original tweet).

Preferably, also the indications 21 and 22 are updated, so that they indicate the overall number of messages related to the selected and, for each type of content, the number of messages containing that type of content.

At the same time, as schematically depicted in FIG. 4c, when the user selects a specific message (either a tweet or a retweet) by clicking the corresponding ray element in the graph 23, a window 30 is opened which shows information on the message, including:

author 300 of the message; and preview 301 of the content of the message.

By selecting the preview 301, the user may access the full content of the selected message.

Figure 4D:
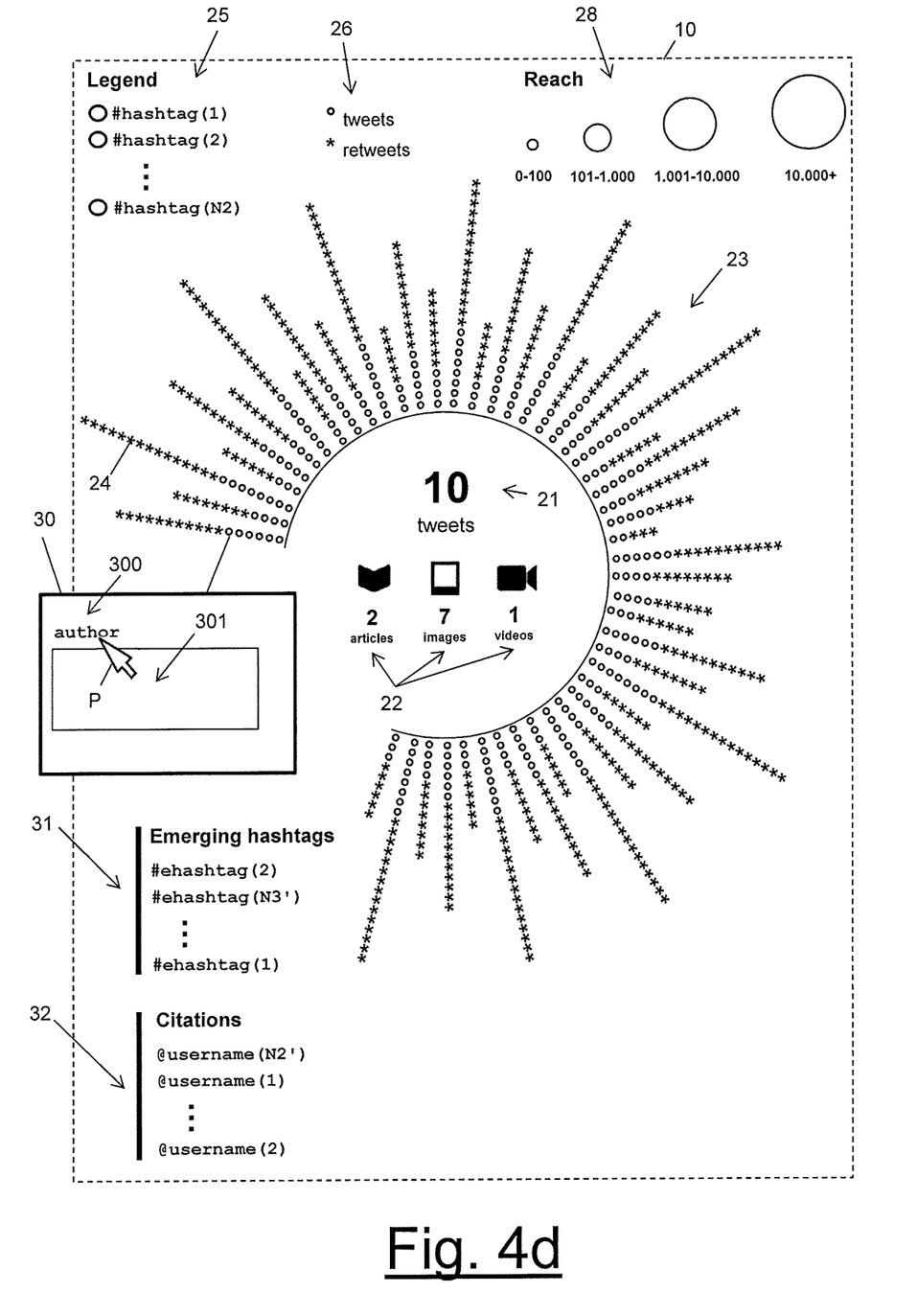

By selecting the author 300, instead, the user interface 10 preferably shows the reference set of messages 50 as aggregated in a further dimension of the array 9, namely the dimension corresponding to the author of the message. In particular, as depicted in FIG. 4d, the user interface 10 shows all the messages from the same author as the selected message. For instance, all the ray elements of the graph 23—except those from author—may be faded, so that the latter only are highlighted, as shown in FIG. 4d. This provides an immediate and intuitive view of the participation of author to the discussion. For instance, from the exemplary situation depicted in FIG. 4d, the user may see that author has been active for a certain number of timeslots (probably because the topic of the discussion was of interest for her/him), then has been silent for a number of timeslots and then has restarted publishing (probably because the discussion reverted to a topic of interest for her/him).

Preferably, also the indications 21 and 22 are updated, so that they indicate the overall number of messages published or republished by author and, for each type of content, the number of messages containing that type of content.

The user may then further explore any one of the messages highlighted in FIG. 4d, by selecting its associated ray element 24. As the user selects anyone of such messages, a window similar to window 30 is opened which shows information on the selected message. This way, the user may easily browse amongst the messages from author and analyze them with the desired level of detail. For instance, by analyzing the content of the messages of author, the user may understand the reasons of the changes in her/his level of participation to the discussion.

The user interface 10 also preferably comprises a list of emerging hashtags 31 and a list of citations 32.

The list of emerging hashtags 31 preferably comprises the emerging hashtags #ehashtag(1), #ehashtag(2), #ehashtag(N3') discovered in the content of the messages of the reference set 50 during the second aggregation step 104 and for which a respective group has been created in the multidimensional array 9. The emerging hashtags #ehashtag(1), #ehashtag(2), #ehashtag(N3') as displayed by the user interface 10 are preferably ordered based on the number of occurrences in the reference set of messages 50. By way of example, in FIGS. 4a-4e it is assumed that #ehashtag(2) is the most popular emerging hashtag.

Similarly, the list of citations 32 preferably comprises the cited usernames @username(1), @username(2), ... @username(N2') as discovered in the content of the messages of the reference set 50 during the second aggregation step 104 and for which a respective group has been created in the multidimensional array 9. Also the cited usernames @username(1), @username(2), ... @username(N2') as displayed by the user interface 10 are preferably ordered based on the number of occurrences in the reference set of messages 50. By way of example, in FIGS. 4a-4e it is assumed that @username(N2') is the most popular citation.

The lists 31 and 32 provide the user with an immediate view of the emerging hashtags and citations as discovered at step 104 in the content of the messages of the reference set 50. This allows the user discovering hashtags and usernames (e.g. those of celebrities or public figures) which the participants to the discussion have deemed to be relevant within the considered reference context.

Besides, by using the list 31 or 32 the user may operate the user interface 10 to show the reference set of messages 50 as aggregated in further dimensions of the array 9, in particular those of the emerging hashtags or citations or origin zones of the messages. In particular, by selecting an emerging hashtag from the list 31 or a citation in the list 32, the user interface 10 preferably highlights in the graph 23 the messages which contain that emerging hashtag or citation. By way of non limiting example, as shown in FIG. 4e, if the user selects #ehashtag(2) from the list 31, a number of arrows 33 is displayed by user interface 10, each arrow connecting the selected #ehashtag(2) with the ray element which represents a message containing #ehashtag(2).

Figure 4E:
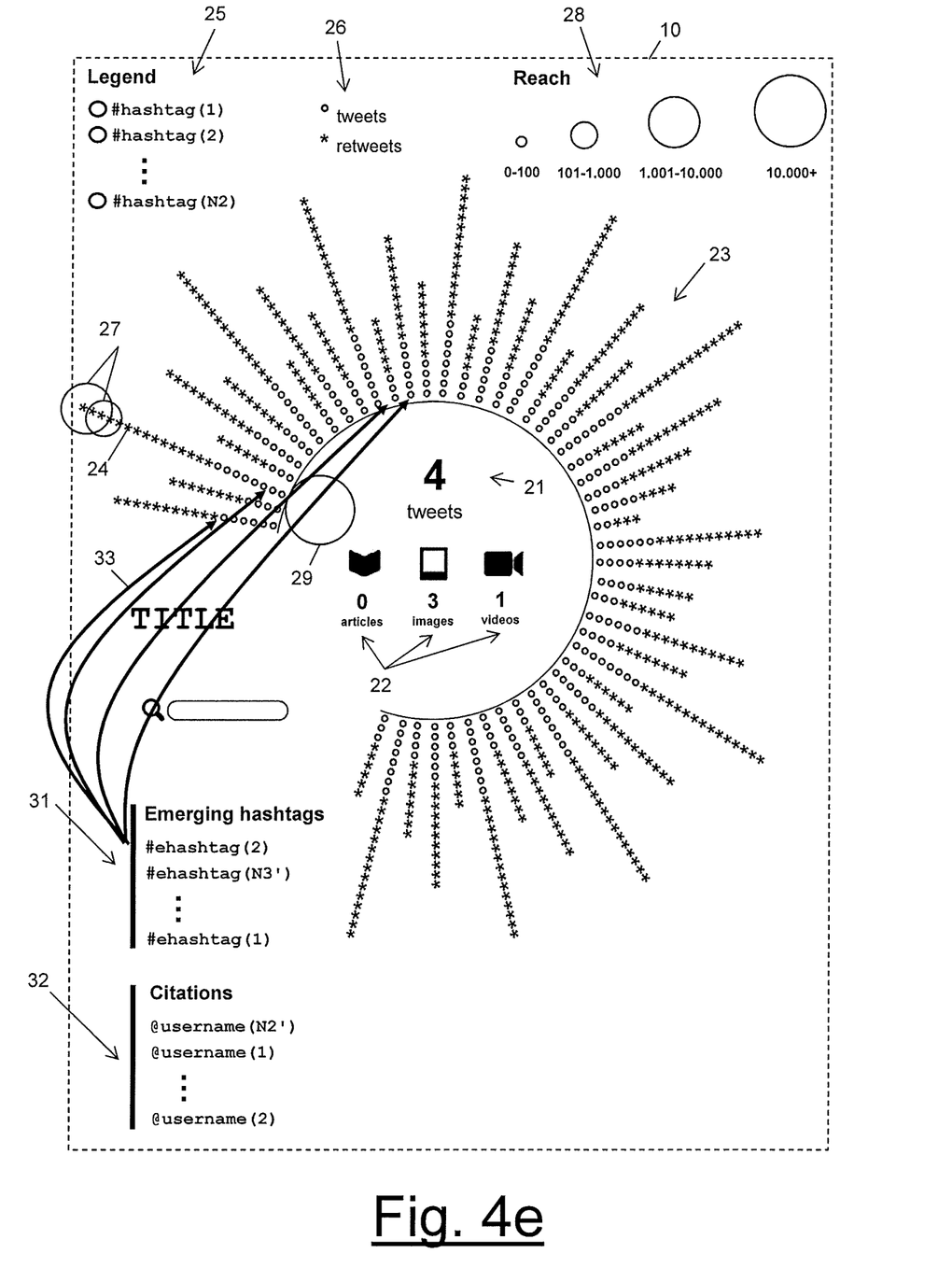

Preferably, as shown in FIG. 4e, also the indications 21 and 22 are updated, so that they indicate the overall number of messages containing the selected emerging hashtag or citation and, for each type of content, the number of messages containing that type of content.

The user interface 10 may also comprise a text search field 34 for searching messages containing a certain word selected by the user.

Preferably, the user has the possibility to customize the user interface 10. For this purpose, before opening the user interface 10 (for the first time or any subsequent time, if she/he wishes to perform some changes), the user preferably compiles a configuration file where she/he may indicate:

- start time and end time of the overall time window to be shown in the graph 23 of the user interface 10;
- geolocalization of the messages to be shown by the user interface 10;
- secondary hashtags which, amongst #hashtag(1), #hashtag(2), . . . #hashtag(N2), are of particular interest and shall accordingly be shown (e.g. by use of different colours of the ray elements 24, as described above) in the graph 23 of the user interface 10. The number of secondary hashtags which may be displayed is preferably lower than a predefined threshold (e.g. 12);
- start time and end time of each timeslot of the graph 23 (each ray of the graph 23 may aggregate the messages from multiple consecutive timeslots TS(1), TS(2) . . . TS(N1));
- type of messages (e.g. tweets only or both tweets and retweets) to be shown in the graph 23;
- whether she/he wishes the emerging hashtags 31 and/or the 32 citations to be shown by the user interface 10 and, in the affirmative, the number of emerging hashtags and/or citations to be shown, which is preferably lower than a maximum predefined threshold (e.g. 30); and
- the colors to be associated to the secondary hashtags and to the background of the user interface 10.

Therefore, advantageously, the multidimensional aggregation performed by the data processing apparatus 6 according to the present invention allows the user investigating at the same time the relations amongst the messages of the reference set 50 from various points of view, namely to conduct a systemic analysis of such messages in a easy and intuitive way, by interacting with the user interface 10.

Since the user interface 10 is configured to show the reference set of messages 50 as aggregated by the data processing apparatus 6 in the various dimensions of the array 9, the user may obtain from the user interface 10 information on various aspects of the relations amongst the messages of the reference set (e.g. time, hashtag, etc.) by interacting with the user interface 10, with no need to perform complex operations such as multiple queries etc.

This way, the user may identify trends, key hashtags, key users, places, new topics, etc. associated with the reference context to which the reference set of messages 50 pertain.

Besides, the above steps performed by the data processing apparatus 6 may be performed in near-real time, namely in batches while the exchange of messages pertaining to the reference context is ongoing. The user may accordingly perform a systemic analysis of such messages in near-real time, so that she/he may use the analysis results for taking actions within the references context, e.g. to improve the communication effectiveness, to increase the reach of the discussion, to increase the participation to the discussion of a certain group of users, etc.

The invention claimed is:

1. A method for processing messages exchanged on a social network by a plurality of user devices connected to a communication network supporting said social network, said method comprising, at a data processing apparatus cooperating with said social network through said communication network:
   a) gathering from said social network a reference set of messages pertaining to a user-selected reference context;
   b) applying a multidimensional aggregation to said reference set of messages, said multidimensional aggregation comprising grouping said messages of said reference set in an array of groups having at least two dimensions, said array comprising, in each dimension, a number of groups that correspond to a number of values of a respective message feature, wherein each group of said number of groups aggregates all the messages of said reference set whose said respective message feature has a same value of said number of values; and
   c) displaying a user interface configured to graphically show said reference set of messages at different timeslots along a curved timeline and aggregated in at least two dimensions of said array,
      wherein the curved timeline includes a time axis that is curved and a plurality of rays extending radially from the time axis, each of the plurality of rays corresponding to one of the different timeslots, and
      symbols corresponding the references set of messages are displayed on the plurality of rays of the different timeslots, different symbols corresponding to different message types.

2. The method according to claim 1, wherein at step a) said reference set of messages is obtained by applying to said messages exchanged on said social network a filtering rule based on one or more values of at least one filtering message feature of said messages, said at least one filtering message feature being chosen amongst:
   - origin place of said messages;
   - publication date and/or time slot of said messages;
   - author of said messages;
   - username and/or hashtag and/or keyword cited in said messages;
   - language of messages;
   - action performed on messages;
   - type of content of messages;
   - content's feature of messages.

3. The method according to claim 1, wherein step a) is performed by an importer software program through invocation of an application programming interface of said social network.

4. The method according to claim 1, wherein at step b) said message feature is chosen amongst:
origin place of said reference set of messages;
publication date and/or time slot of said reference set of messages;
author of said reference set of messages;
username and/or hashtag and/or keyword cited in said reference set of messages;
language of said reference set of messages;
action performed on said reference set of messages;
type of content of said reference set of messages;
content's feature of said reference set of messages.

5. The method according to claim 1, wherein at step b) said number of values of said respective message feature are predefined values decided by a user.

6. The method according to claim 5, wherein step b) also comprises applying a further multidimensional aggregation to said reference set of messages, said further multidimensional aggregation comprising expanding said array of groups by adding, in a further dimension, a further number of groups that correspond to a further number of values, or of clusters of values, of an emerging message feature as discovered in said reference set of messages by said data processing apparatus, each group of said further number of groups aggregating all the messages of said reference set whose said emerging message feature has a same value of said further number of values or a value belonging to a same cluster of the further cluster of values.

7. The method according to claim 1, wherein said user interface is configured to provide by default a graphic representation of said reference set of messages as aggregated in at least one dimension of said array, as a user opens the user interface.

8. The method according to claim 7, wherein said user interface is configured to be browsed by said user so as to provide a graphic representation of said reference set of messages as aggregated in at least one further dimension of said array.

9. A data processing apparatus comprising a processor configured to perform the steps of the method according to claim 1.

10. A non-transitory computer-readable medium encoded with computer-readable instructions that, when executed by a computer, cause the computer to perform the method according to claim 1.

\* \* \* \* \*